United States Patent [19]

Parshall et al.

[11] Patent Number: 4,912,350
[45] Date of Patent: Mar. 27, 1990

[54] STATOR CORE UNIT FOR DYNAMOELECTRIC MACHINE

[75] Inventors: Millis V. Parshall, Erie, Pa.; Allen J. Zaitz, Wausau, Wis.

[73] Assignee: Marathon Electric Manufacturing Corporation, Wausau, Wis.

[21] Appl. No.: 296,344

[22] Filed: Jan. 9, 1989

Related U.S. Application Data

[63] Continuation of Ser. No. 897,059, Aug. 15, 1986, abandoned.

[51] Int. Cl.⁴ ............................................. H02K 1/06
[52] U.S. Cl. .................................... 310/217; 310/57; 310/59; 310/91; 310/258
[58] Field of Search ............... 310/55, 57, 58, 59, 310/60 R, 60 A, 64, 65, 216, 217, 254, 257, 258, 259, 62, 63, 42, 91

[56] References Cited

U.S. PATENT DOCUMENTS

| | | | |
|---|---|---|---|
| 1,156,639 | 10/1915 | Starker | 310/217 |
| 1,227,571 | 5/1917 | Blumberg | 310/217 |
| 2,465,275 | 3/1949 | Rushing | 310/254 |
| 2,508,207 | 5/1960 | Woll | 310/57 |
| 2,818,515 | 12/1957 | Dolenck | 310/57 |
| 3,221,195 | 11/1965 | Hoffmann | 310/212 |
| 4,485,320 | 11/1984 | Kawada | 310/217 |
| 4,538,084 | 8/1985 | Kawada | 310/64 |

FOREIGN PATENT DOCUMENTS

0195995 7/1957 Austria ............................ 310/258

Primary Examiner—R. Skudy
Attorney, Agent, or Firm—Andrus, Sceales, Starke & Sawall

[57] ABSTRACT

An A.C. alternator includes laminated stator core with an tubular frame formed from a plate member which is wrapped tightly about the core and with the opposed end edges of the frame plate welded to the core. The stator laminations having a square perimeter with the corners rounded with a radius of the final core diameter. The corner portion are further provided with a control welding notch and a plurality of circumferentially distributed openings. The laminations are stacked in rotated relation to form the core with a true constant diameter. Each lamination is rotated in the same direction of rotation for 120 degrees relative to the adjacent laminations. The multiple openings in the corner portions are constructed and arranged such that the rotating laminations aligned the similar openings and define a plurality of unobstructed axial cooling passages. The laminations are rotated to establish skewed elongated slots, central notches and air flow openings. At least one of the corners is especially formed with two offset portions with a rigid bar welded to the inner recess and defines a frame connection surface. A weld bar is secured to the inner bar and outer recess in axial alignment with the core axis. The frame plate is wrapped with the seam aligned with the weld bar and the frame welded in place.

16 Claims, 3 Drawing Sheets

STATOR CORE UNIT FOR DYNAMOELECTRIC MACHINE

This is a continuation of application Ser. No. 06/897,059, filed Aug. 15, 1986 now abandoned.

BACKGROUND OF THE PRESENT INVENTION

The present invention relates to a stator core structure for dynamoelectric machine, and particularly for an alternator supplying alternating current power to a load distribution system for one or more loads.

Dynamoelectric machines conventionally include an annular stator within which a rotating rotor is rotatably mounted. Engine driven alternators are used for generating alternating current powers in various applications are one example of such machines. Alternators are available for example for providing three phase alternating current at 240/480 volts. The alternator is generally a rotating field construction, with a three phase output winding wound within an annular stationary stator. Conventionally, the stator is formed as a round cylinderical member. The stator is fixedly and rigidly mounted with a tubular mounting frame. The heat generated by the relatively large currents in the windings require forced cooling of the stator to prevent damages to the windings and stator core structures. In open ventilated motors having forced cooling, suitable supporting spacers are circumferentially located about the stator core to space the frame outwardly and define cooling passageways between the outer tubular frame and the exterior surface of the stator core. An appropriate fan unit is coupled to the alternator shaft and is driven therewith to develop an appropriate forced air stream through the alternator and particularly over the stator core to continuously cool the alternator during operation thereof.

Totally enclosed alternators and other dynamoelectric machines are also produced without the internal passageways. In such machines, a finned frame or some other cooling means may be provided. A further highly significant consideration in the construction of dynamoelectric machines is the optimizing of the magnetic material in the core so as to produce an efficient magnetic circuit for the magnetic fields. Thus, cooling and mounting openings in the core tend to effect the path for the fields, and may generally change the path in such a manner as to adversely effect the system.

Although such alternators have been constructed for many years and have produced commercially satisfactory operations, the construction of the core and the assembly of the various spacer and frame components into a final assembly is reasonably costly.

The stators are laminated structures formed of round laminations. The laminations are stamped from a flat strip stock of appropriate magnetic material. There is also a significant material waste as the result of the round configuration with the typical commercial production.

Various alternate constructions have been suggested wherein a substantially square lamination is used with the corners specially shaped for clamping of the stack of laminations together and for mounting of the core to a suitable frame structure when the square stator core is mounted in an annular encircling frame, cooling passageways are formed on the four sides of the core. Such a structure for example is shown in U.S. Pat. No. 2,508,207 which issued on May 16, 1950.

A further modification to the use of a relatively square lamination is disclosed in U.S. Pat. No. 2,818,515 which issued on Dec. 31, 1957. The lamination is formed with a special outer edge configuration defining outward projection from an annular continuous portion including the stator teeth and slot. The laminations are assembled into groups of laminations and the groups are rotated relative to each other to form a stator with circumferential projections and cast within an encircling frame structure. The offsetting of the several groups and casting within the frame structure produces a series of tortuous paths about the projections and thus between the annular portion and the outer cast frame. Although such structure has certain advantages from the standpoint of manufacture, the casting of a frame is not considered a preferred fabrication procedure and the grouped laminating form establishes the airflow path generally in a tortuous path with sharp turns which may restrict rapid cooling of the alternator. Further. The flux pattern and movement within the core structure and particularly the outer most portions thereof is erratic and the extended portions would not appear to significantly contribute to the effective and efficient operation or magnetic functioning of the alternator. Thus, the flux paths within the stator core do not provide a smooth continuous magnetic path with minimum significant air gaps. The stator structure shown in U.S. Pat. No. 2,818,515 also includes the stator stacked between the pressure rings and having rods or iron anchors passing through the grooves formed by grouped laminations and forming an integrated part of the pressure rings and the frame to hold the stacked lamination together as shown in such patent.

There is a need for a laminated stator core structure which can be directly assembled with a tubular cylindrical frame, with an optimum flux distribution within the core and in selected designs with appropriate internal mounting and cooling passages.

SUMMARY OF THE PRESENT INVENTION

The present invention is particularly directed to a laminated stator structure for a dynamoelectric machine in which the stator core is directly assembled within an appropriate and encircling tubular frame and in which the stator core is specially constructed to produce a larger effective magnetic diameter, with a more uniform electrical flux distribution within the stator core. The stator may also be constructed to produce an efficient internal cooling of the stator core and interconnected and supported windings in an internally ventilated construction. The tubular frame is preferably formed from a frame plate member which is wrapped tightly about the core and with the opposed end edges of the frame plate member welded to the core to secure the core within the frame.

Generally, in accordance with the present invention, the stator is formed of stamped laminations having a generally square outer perimeter or configuration. The four corner portions of the square laminations are formed with a radius corresponding to the final outer diameter of the stator core and the inner diameter of the supporting frame structure. The corner portions have a significant circumferential extend and at least one of the corners is formed with a special attachment notch. The corner portions are further provided with a plurality of circumferentially distributed openings where internal cooling passages are to be provided. The attachment notches and cooling openings when used are preferably formed in each corner to produce a plurality of circumferentially distributed aligned notches and openings. The notches and openings are restricted in the corner structure to the increased outer radius portion to maintain a continuous annular core at least corresponding to the minimum thickness provided to the sides of the substantially square laminations. The laminations are assembled in stacked relations to define an elongated stator core of the necessary axial length for the alternator and with a true constant diameter such that the wrapped frame engages the core through the interface therebetween. In accordance with the present invention however, adjacent laminations and preferably each lamination is rotated relative to the adjacent laminations and the corners are angularly offset to define a continuous circular outer surface and with internal poles and slots of a particular design. In a preferred construction of three phase stator core, each lamination is rotated in assembly and thereby angularly offset in the same direction of rotation for 120 degrees relative to the adjacent laminations. The notch and multiple openings in the corner portions are constructed and arranged such that the rotated laminations aligned the similar openings and define a plurality of essentially unobstructed cooling passages throughout each of the extended corner portions. Further, the corner portions are also provided with common edge notches for welding of the laminations to each other, and where provided to a connecting member, and thereby establishing an integrated stator core.

In a skewed stator design, the stacked laminations are preferably constructed and angularly offset to establish skewed elongated notches and air flow openings for establishing improved stator functioning. At least one of the corners is formed with a special attachment notch including outer offset portions. In the stacked laminated core, a rigid interconnecting bar unit is welded within the special attachment notch to define a frame connection surface. A frame connecting weld bar or plate is secured to an inner bar, with the bar in axial alignment with the axis of core. The assembled integrated laminated core is wrapped with an outer frame plate having a seam aligned with the weld bar or plate. The tightly wrapped frame is then welded in place to the weld bar to complete the interconnection of the frame and stator.

The punched laminations can be very accurately formed such that the integrated round core of the multiple rotated laminations has an outer diameter which is a true surface for interconnection of the frame. The edge corner welding notches contribute to easy fabrication of the stator assembly and the welded interconnection to the frames. Further, the square laminations with the use of the corner structures minimize material scrap while the punched slots provide an highly effective and large cooling surface. The multiple rotated laminations produces an increased effective magnetic diameter with significant magnetic symmetry, thereby contributing to the optimum electrical efficiency of the alternator.

More particularly in a preferred embodiment of the present invention, the corner structures of the laminations are specially formed with the securement notches and similar multiple openings formed to the opposite sides of each notch. Each lamination is rotated and angularly offset 120 degrees with respect to the adjacent laminations. All four corners are similarly formed with a central notch extending down through the continuous annular portion. The base of the notch is especially formed to receive a clamping rod which is welded to the aligned notched laminations in the stack to securely and firmly interconnect the several laminations along the corresponding peripheral edge at the twelve equicircumferentially notches on the outer periphery of the core. The number of grooves formed by aligned notches will vary with the degree of rotation and the described unit is for one practical design.

Openings in three of the corner structures are similarly formed and include a plurality of openings located to the opposite sides of the groove. In a preferred construction, three generally right triangular openings are formed to each side of the groove. The openings include a large opening immediately adjacent the notch and having the hypothenuse extending circumferentially and radially from the base of the notch to the outer edge of the rounded corner. Within the adjacent portion of the corner portion, a generally equi-sided triangle portion includes two similar oppositely extending right triangle openings having substantially equal sides and being substantially smaller than the first opening.

The multiple triangular openings produce a high strength stator core. Although the use of a plurality of such openings somewhat decreases the size of the air passages, an increased cooling surface is created and essentially similar cooling is obtained while maintaining the high strength.

The laminations formed for skewed slots also creates skewed notches and air passageways through the alternator core.

The one or fourth corner structure is formed with a specially formed notch having an inner central portion for receiving a welded connecting rod. The outer portion of the connecting corner however is not provided with the first air openings. Rather, the outer corner portion is maintained continuous with a stepped notched or recessed outer construction. The stepped recessed portion defines an inner recess which is closed by a support plate. A frame welding bar is welded within the outer stepped recess and particularly to the closed recess. The frame welding bar is located in parallel alignment with the axis of the core and defines an aligned surface for welding of the frame seam to the core.

The ventilated stator structure provides a highly efficient and economical method of forming and fabricating the stator for a dynamoelectric machine and particularly a power alternator or the like with improved magnetic filed flux distribution. The rotation of the lamination causes the "effective" magnetic diameter to be larger than the distance across the flat side edges or walls of the core and also maintains magnetic symmetry about the stator. The material of the square laminations are effectively totally used except for a small portion of the lamination which is removed to define the circular outer true diameter, and the use of the corner portion effectively enlarges the magnetic diameter. In an internally ventilate machine, the multiple air vent slots produces a highly effective and extended cooling surface area, without sacrificing the magnetic characteristics of the stator core and without the necessity for multiple part component assembly such as heretofore widely used in the construction of alternators. The use of true core outer diameter permits easy and convenient fabrication and assembly of the outer frame and structure and its interconnection to its stator core.

The total construction therefore significantly contributes to the commercial implementation with present day technology.

BRIEF DESCRIPTION OF THE DRAWINGS

The drawings furnished herewith generally illustrate the best mode presently contemplated for the invention and are described hereinafter.

In the drawings.

DESCRIPTION OF THE ILLUSTRATED EMBODIMENT

Figure 1:
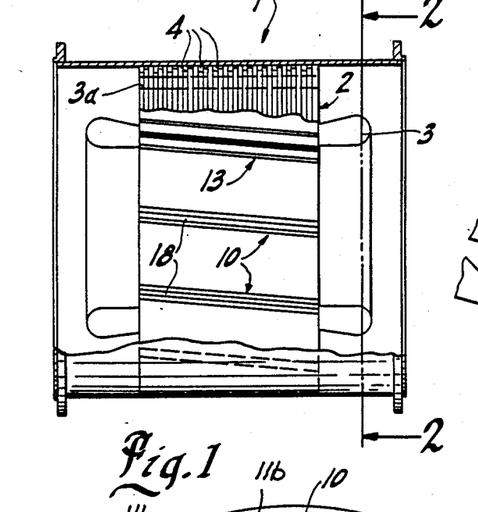
FIG. 1 is a plan view of an alternator stator unit with parts broken away and sectioned to illustrate inner detail of the construction.

Referring to the drawing and particularly to FIG. 1, an alternator unit is illustrated including an outer tubular metal frame 1 within which an annular stator core 2 is rigidly affixed. A stator winding 3 is wound in the stator core, and a rotating magnetic field rotor, not shown, is rotatably mounted within the stator core to generate a magnetic field cutting the stator winding in accordance with conventional practice to generate an alternating output. The illustrated alternator is adapted to generate operating power for driving of multiple consuming loads and the electrical efficiency of the stator construction is of substantial significance. The operation of the alternator also generates significant heat within the winding. The alternator is provided with a forced cooling means such as a fan coupled to the rotor. The core 2 is specially formed with air passages 3a in the outer portion of the core adjacent the metal frame 1.

The present invention is particularly directed to the construction of the stator core 2 and its interconnection to the encircling outer metal frame 1 and a preferred embodiment and method of fabrication is shown and described.

Figures 2, 4:
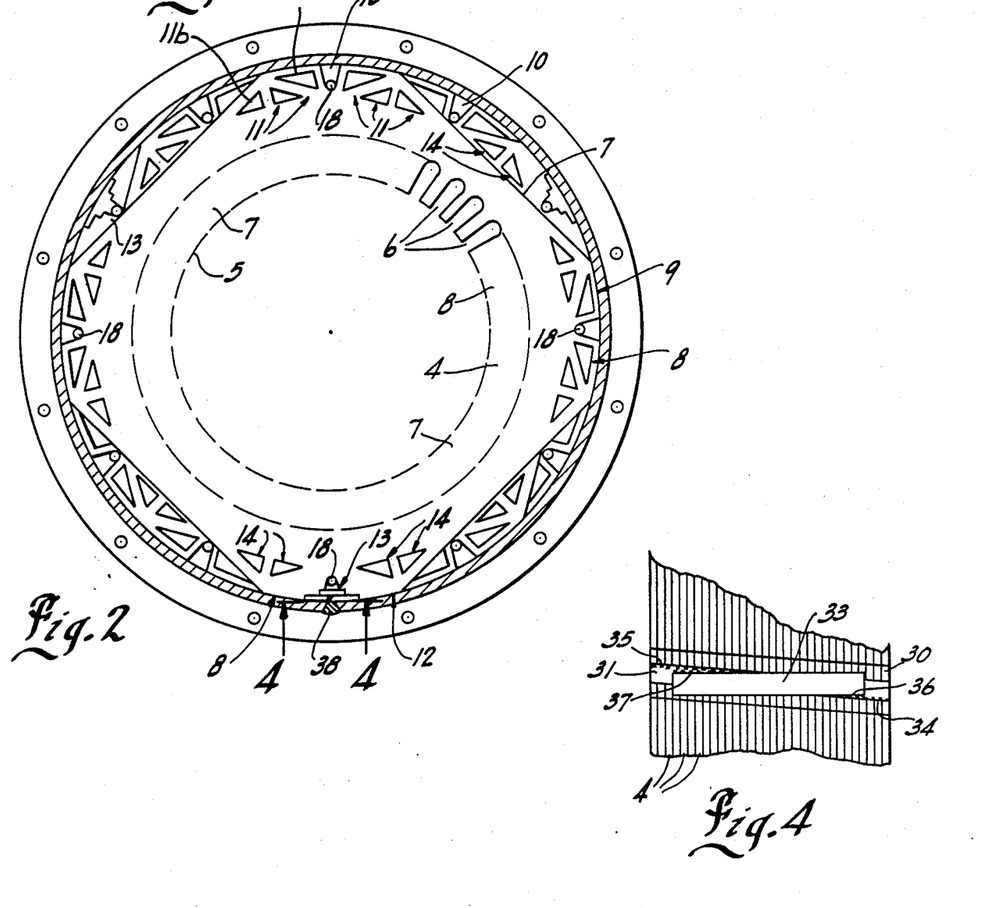
FIG. 2 is an end elevational view of the alternator stator core taken generally on line 2—2 of FIG. 1.
FIG. 4 is a view taken generally on line 4—4 of FIG. 2.
Figure 3:
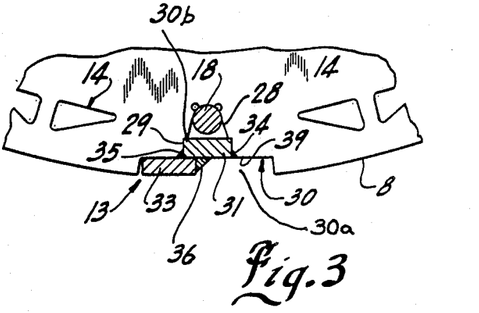
FIG. 3 is an enlarged fragmentary view of the stator core illustrating the attachment structure for attachment to the frame.
Figures 5, 6, 7:
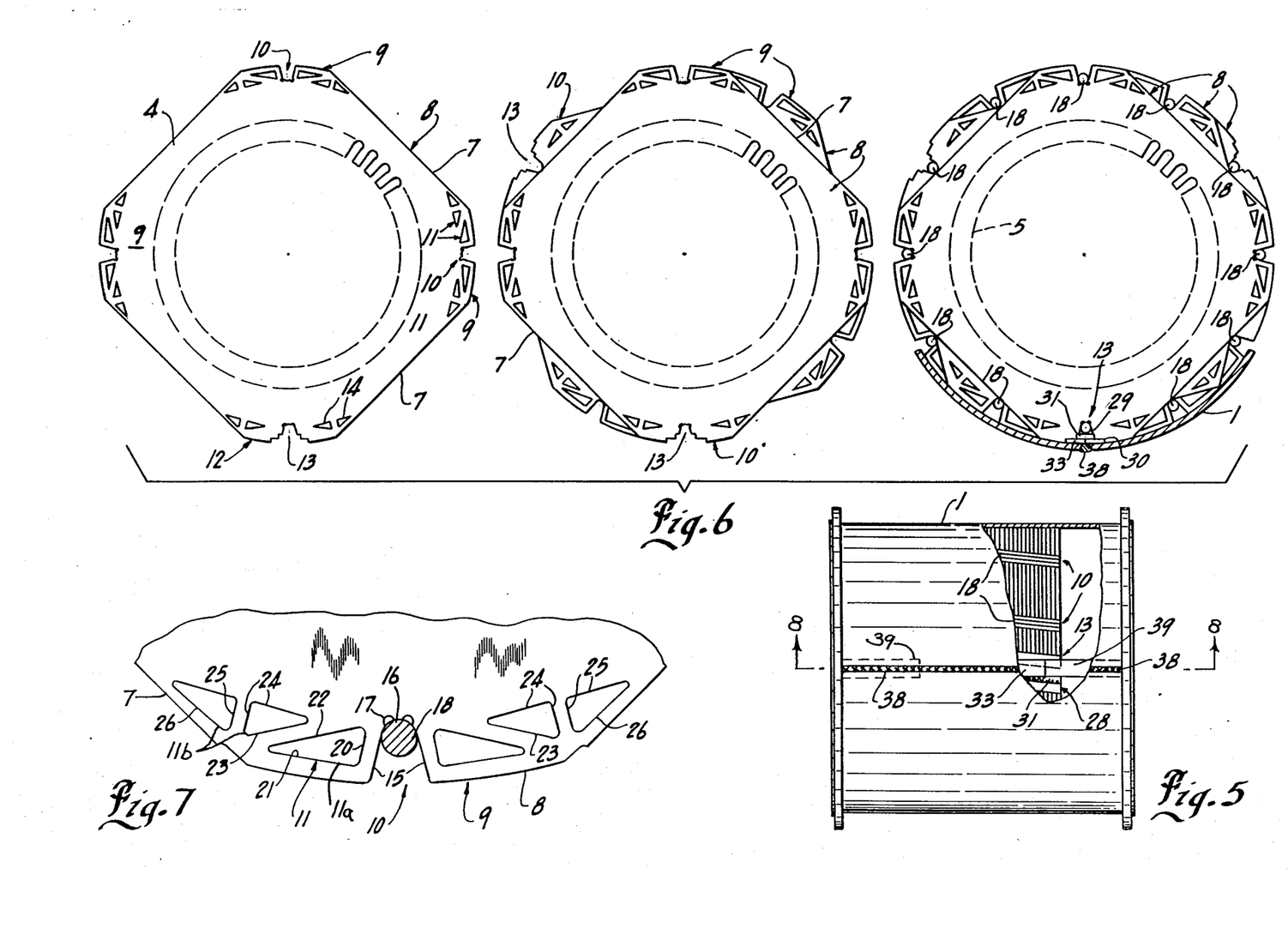
FIG. 5 is a elevational view with parts broken away to further show the frame and core attachment.
FIG. 6 is a multiple view illustrating steps in the assembly of the alternator stator core shown in FIGS. 1-5.
FIG. 7 is an enlarged fragmentary view of the core further illustrating the forming of the stator core.

Referring to the FIGS. 2-4, the laminated stator core 2 is formed from a plurality of like square laminations 4, particularly shown in a preferred construction in FIG. 6. The square lamination 4 has an internal circular opening 5 with the stator slots and teeth 6 formed on the inner surface portion. The width of the lamination on the diametrically opposite flat sides 7, between the slots 6 and the side 7, are equal and correspond to a minimum core thickness desired for optimum alternator design. The lamination 4 is basically formed as a square flatted member which is stamped from a suitable metal stock. The four corners of the lamination are removed on a radius 8 to define a round or circular corner structure 9 corresponding to the final diameter of the core 2. The round edges of the corners are formed with a substantial circumferential length, and typically about 30 degrees. The corner portions of the square lamination 4 define radial outward extensions of the continuous annular portion including the slot and teeth 6.

Generally, each of the four corners is formed to define a lamination connecting notch and a plurality of air passages cooling or openings. Three of the corners are formed with similar construction including a centrally located notch 10 and a plurality of similar air passage openings 11 having a right triangular shape or configuration located to the opposite side of the notch 10. The fourth corner 12 is formed with a special frame mounting notch 13 and lesser but similar air passage openings 14 also having a right triangular shape of to the opposite side of its notch 13. Openings 11 include different sizes and for clarity of explanation and description, the larger openings are identified by the number 11a and the smaller openings by the number 11b.

Referring to one of the three similar corners 9 which are identically formed, a description thereof is given in detail, with corresponding elements of the other two corners identified by the corresponding prime and double primed numbers.

The corner structure 9 (FIGS. 2, 6 and 7) is formed with the cylinderical outer radius and with the notch 10 located centrally thereof. The notch 10 projects inwardly symmetrically about a radius line. The notch 10 includes tapered sidewalls 15 (FIG. 7) defining a large entrance opening which decreases inwardly of the notch to a notch base 16. The base 16 is concave and connected to the inclined sidewalls 15 by small circular connections 17. The inner end of the notch 10 defines a connecting recess for receiving of an interconnecting weld for directly welding of adjacent lamination. Alternatively an interconnecting round bar 18 (FIG. 7) is located in selected notches and welded to clamping end rings to securely clamp the lamination into a rigid core structure. The latter structure is generally used in larger sized cores.

The base (16 FIG. 7) of the notch is located or spaced outwardly a sufficient distance from the inner rotor opening 5 to maintain a continuous annular portion of a length somewhat greater than the width of the lamination at the sidewall or edges 7 of the laminations.

The plurality of openings 11a and 11b are located in symmetrical fashion to the opposite sides of the notch 10 on a radius line passing through the base 16 such that the basic core stock is maintained at a minimal dimension and the corners form an enlarged extension of the magnetic material.

In the illustrated embodiment of the invention, air passage openings 11a and 11b are similarly formed to the opposite side of the connecting notch 10, as shown in FIG. 7. The openings 11a are first relatively large air passage opening having the right angle legs 20 and 21 extending respectfully parallel to the adjacent side edge of the notch 10 and a radially outermost edge 21 extending generally parallel to the outer edge of the circular corner structure 9. The hypotenuse edge 22 of the air passage opening 11a extends circumferentially and radially outwardly from the leg 20 adjacent notch 10. The edge 22 is also specially located with respect to the notch 10 and particularly to form a tangent to the circle generated within the base. This sets a reference edge such that aligned and rotated laminations maintain unobstructed notches and openings throughout the axial length of the stack of laminations. The opening contracts from adjacent the notch outwardly toward the periphery of the core. The small end of this air passage opening 11a is located to define a generally triangular portion with the adjacent straight side edge 7 of the lamination. Within such triangular portion, a pair of oppositely extended air passage openings 11b, which are smaller than opening 11a, are formed. The first air passage opening 11b is located with its hypotenuse 23 spaced inwardly and partially overlapping with the hypotenuse edge 22 of the second air passage opening 11a. The first air passage opening 11b expands laterally outwardly towards the side wall with right angle legs 24 extending respectively circumferentially and radially. The second air passage opening 11b is in a reversed orientation and generally corresponds in size to the first opening. The base leg 25 is spaced from the base leg 24 of the first opening 11b and the hypotenuse 26 is generally parallel to the side edge 7 of the lamination 4.

Similar air passage openings 11 are provided to the opposite side of the notch 10 with corresponding construction and orientation, as shown in FIG. 7. The opening 11a and two openings 11b thus define first, second and third cooling openings to the opposite side of each notch 10.

As previously noted, the other two adjacent corners 9 are similarly constructed.

The fourth corner 12 (FIGS. 2-4) has the unique frame mounting notch 13 which is specially constructed for interconnecting of the stator core to the encircling metal frame 1.

The notch 13 has an inner base portion 28 essentially corresponding to the inner base portion of the notches 10 in the other three corners. The outer portion of the notch 13 however includes a stepped recess construction having stepped sidewalls including first and second steps 29 and 30. The first step 29 adjacent the base portion defines inner an opening and recess 30b somewhat larger than the opening to the inner tapered base portion 28. The second step 30 is an outer step and forms the second larger recess 30a adjacent the periphery of core 2. As shown in FIGS. 3 and 4, the inner recess 30b of notch 13 is closed by a connecting bar or plate 31 which is located within the steps 29 and closes the base portion 28. The plate 31 is located coplanar with the base of the second steps 30. This provides an enlarged continuous wall for the outer recess within the outer circumference of the lamination and the core 2. The total width of the enlarged recess is selected such that a frame weld bar or frame member 33 extending precisely parallel to the axis of the core 2 is located within the enlarged skewed notch. Thus, the skewed formation of the openings and the connecting notches on the outer periphery of the core 2 would normally prevent the axial alignment of the weld bar in the notched structure. The enlarged notched recess establishes the necessary circumferential width to accommodate the axial orientation within the skewed notch. The recess 30a thus provides an unobstructed axial length on the outer surface of the core to receive the weld bar 33 aligned with the axis of the core.

As the result of the enlargement of the recess 30a, the air passage openings 11a adjacent to the notch as provided in corners 9 are eliminated from corner 12 of the lamination 4. Air passage openings 14 are similarly located and formed in the corner structure.

The orientation and construction of the openings are such that the rotation of adjacent lamination through 120 degrees angularly offset and aligns the several openings on the correspondingly shaped corners. The fourth corner structure 13 develops three aligned enlarged frame mounting notches 13 extending longitudinally throughout the length of the assembled stacked laminations. The frame mounting notches 13 will be spaced from each other by 120 degrees. The outer interconnecting notches 10 and 13 are equicircumferentially spaced about the core 2. The stator core assembly otherwise presents a continuous true circular outer surface. The aligned air mounting openings 11 in every third lamination establishes a series of individual air passageways through which a high velocity cooling air passes for efficient cooling of the core and stator winding.

The intermediate notches define twelve grooves for welding or interconnecting of the laminations to each other to securely interconnect the laminations into a single integrated structure. The special frame mounting notches 13 have the inner portion formed for receiving of interconnecting welds and/or welded bars deposited therein and welded to the laminations.

Figure 8:
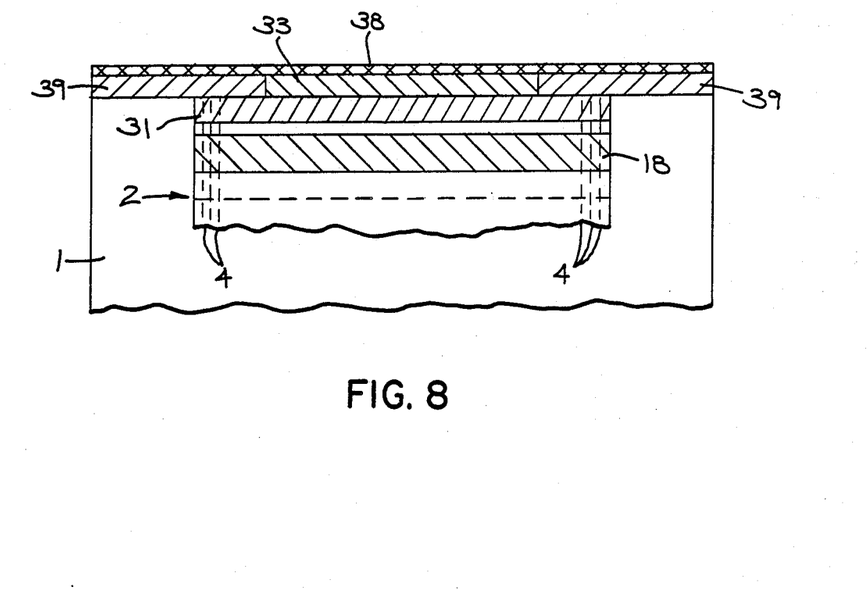
FIG. 8 is an enlarged sectional view taken generally on line 8—8 of FIG. 5.

One of the three special frame mounting notches 13 are closed with the plate 31 located within the smaller inner stepped recess 29, as most clearly shown in FIGS. 3, 4 and 8. The plate 31 is welded in place by welds 34 and 35 which extend inwardly from the opposite edges of the lamination core 2. Weld 35 extends from the one face of core inwardly only to the intersection with the frame bar. Weld 35 is formed from the opposite face of core 2 to its location or intersection with the frame bar 33. The frame bar is located in appropriate axial location and the opposite edges welded to the plate 31 including a first weld 36 from the weld 34 of the first bar welded to the outer end of the bar, and a second weld 37 from weld 35 to the end of bar 33.

The width of the bar is selected for proper welding of the frame to the bar. The length of the frame bar 33 is somewhat less than the length of the core 2 for subsequent fabrication to the frame. The frame bar 33 must be flush with or below the outermost diameter of the finalized core 2. This is necessary to insure that the frame 1 tightly wraps about and engages the true cylinderical surface of the stator core 2 in the wrapped, aligned and welded in place position.

In summary, the stator core 2 is formed as described above with the angularly offset laminations 4 welded along the base of the with notches 10 and 13 and notches 13 closed by plate 31 and bar 33. Frame 1 is formed by a frame plate which is tightly wrapped about the core 2 using appropriate machinery and with the opposed and generally abutting edges of the frame plate aligned with the welded outer frame bar 33 and forming a seam 37a. The frame is welded to the frame bar as by a longitudinal weld 38 on the seam 37a. A pair of extended bars 39 are located on the frame in alignment with the welded frame bar 33 and extend outwardly as extensions thereof. The frame weld 38 secures the frame to the bar 33 and to bars 39 to secure the frame 1 to the core and close the frame seam formed by the abutting edges.

The present invention provides an improved magnetic core as the result of the "flatted laminations" having integral corners located such that with the appropriate rotation of each lamination to define a true outer core diameter for the frame, and the attachment notches, and as well as the ventilating passages when incorporated into the design which are integrally formed within the lamination produce a maximum effective magnetic diameter with symmetrical magnetic distribution, and highly effective cooling passageway. The rotation of each of the laminations is highly desirable to maintain the proper optimum magnetic symmetry within the core structure and thereby maintaining the most effective and efficient functional operation of the stator core assembly. There is a minimum amount of scrap because of the extended corner structure to obtain the larger magnetic diameter as well as the integral air passageways. The proper assembly of the laminations to a stacked assembly to provide a true cylinderical surface is readily provided and forming of the laminations as well as the minimum fabrication required to interconnect the core bars and the frame are significant in permitting commercial usage of the invention.

Various modes of carrying out the invention are contemplated as being within the scope of the following claims particularly pointing out and distinctly claiming the subject matter which is regarded as the invention.

I claim:

1. A laminated stator core for an A.C. alternator having an outer circular frame having an inner diameter, comprising a plurality of like laminations abutting each other and forming a stack of laminations, each lamination having a substantially square configuration and a central round opening, each of said laminations having four sides and four corners and each corner formed with a round edge having an outer radius corresponding to the inner diameter of the outer circular frame, said laminations being angularly offset to angularly offset said corners and define an outer round surface and to define a skewed stator core, the corners of each of said laminations being correspondingly formed with a centrally located attachment notch, and a plurality of corresponding cooling openings within each corner of each lamination to the opposite side of said notch, said notch in at least one of said four corners of each of said laminations having stepped sidewalls defining a large outer recess and an inner recess, said notches having said stepped sidewalls being aligned to form a skewed recess, a first plate member fixedly secured within said inner recess and defining a continuous flat surface with the stepped sidewalls of said outer recess, and an axially aligned second plate member fixedly secured in said outer recess defining an outer surface no greater than said outer radius.

2. The stator core of claim 1 wherein said first plate member is welded to said laminations and said second plate member welded to said first plate.

3. The stator core of claim 1 wherein each of said laminations being angularly offset relative to the adjacent laminations.

4. The stator core of claim 3 wherein each of said laminations being angularly offset in the same direction by 120 degrees with respect to the adjacent lamination, and defining equicircumferentially spaced skewed notches.

5. The core of claim 1 wherein a frame tightly encircles said stack of laminations and said frame having a single seam aligned with said second plate member, and means affixing said seam to said second plate member.

6. The core of claim 1 wherein three corners of said four corners are correspondingly formed and having a fourth corner, each of said three corners includes a plurality of said cooling openings to each side of said notch in the corner, said openings including a first cooling opening with the shape of a right triangle and having first and second sides of the opening extending generally parallel to said notch and to the outer circumference of said corner and having a hypotenuse side extending circumferentially and radially outwardly between the opposite outer edges of said first and second sides of said notches, said plurality of cooling openings to each side of said notch including second and third cooling openings with the shape of a right triangle and said second cooling opening located outwardly and generally aligned with said first opening, said third cooling opening generally corresponding to said second cooling opening and located adjacent said second cooling opening.

7. The core of claim 6 wherein the fourth corner includes cooling openings corresponding to said second and third cooling openings.

8. The core of claim 1 wherein each of curved edge of said laminations has a length of about 30 degrees.

9. A stator assembly comprising a tubular mounting frame having an inner radius, a plurality of essentially identical laminations having a center rotor opening with a plurality of winding slots circumferentially spaced about the rotor opening, each of said laminations having a generally square configuration with four sides and four corners, a stack of said laminations including abutting and aligned adjacent laminations to form an annular stator core having an axis, each of the four corners of said generally square laminations having a circular outer surface and having a radius corresponding to the inner radius of said tubular mounting frame, said corners having interconnecting notches and said notches being aligned to define a longitudinal interconnecting notch for interconnecting said laminations and at least one selected interconnecting notch having a frame member closing the corresponding notch, said frame member extending parallel to the axis of the core, said laminations being each angularly offset by an equal number of degrees from each adjacent lamination to distribute said corners and define an essentially continuous circular outer core, said core being located within said tubular mounting frame with the corners abutting the tubular mounting frame, and means secured to said tubular mounting frame and to said frame member and physically joining said mounting frame to said frame member.

10. The stator assembly of claim 9 wherein said laminations are angularly offset relative to each adjacent lamination and the notches in the adjacent lamination are angularly offset to skew the said selected interconnecting notch, said selected interconnecting notch having an outer recess having a base wall of a width defining an unobstructed axial length on the outer surface of the core aligned with the axis of the core, said frame member being welded to the base wall of said outer recess.

11. The stator assembly of claim 9 wherein said selected interconnecting notch projects inwardly centrally of the corner with an inner base wall and outwardly extended first and second side walls with said base wall of the notch generally spaced to maintain a minimal magnetic path between the winding slots and said base wall at least as great as the distance between the winding slots and the aligned outer edge of the side of said square lamination, at least one cooling opening located to one side of said selected interconnecting notch and a second cooling opening located to the opposite side of said selected interconnecting notch, said first and second cooling openings each being formed with an elongated linear intermost edge, said elongated linear innermost edge being angularly oriented at an angle related to the offset angle of the lamination and extending on a tangent to the center of said base wall of said selected interconnecting notch whereby the angular offset of said adjacent laminations results in the alignment of the cooling openings in spaced laminations and the angular offset of said adjacent laminations maintains complete axial exposure of said notches to define corresponding edge grooves.

12. The stator assembly of claim 11 having an attachment notch in each of said corners whereby a plurality of circumferentially distributed attachment notches are located about the stator core.

13. The stator assembly of claim 12 wherein said attachment notch includes inclined side walls and an inner base wall connected by a round corner, and said angularly offset laminations align a plurality of notches with the inclined side walls aligned and a securement means connected to the laminations in said attachment notch.

14. The core structure of claim 13 wherein said notches have a depth whereby the adjacent notches in adjacent laminations are aligned, and aligned bases define a substantially continuous surface throughout the base of said aligned notches, and said securement means being a weld extending through the length of said aligned notches and defining said securement means.

15. The core of claim 13 wherein each corner of said laminations includes one said attachment notch extending from the outer edge substantially radially inwardly, each of said laminations being angularly offset by essentially the same number of degrees and being angularly offset at least 30 degrees, whereby every lamination spaced from another lamination by the number equal to the angular offset divided into 360° has said four corners aligned with corners of said other laminations, and said means disposed within said grooves for interconnecting of said laminations into a rigid stable stack of laminations having a true cylindrical outer surface.

16. A stator lamination unit adapted to be stacked with similar laminations to form an annular stator core having an axis and a core diameter, comprising a flat lamination of a substantially square configuration, said laminations being adapted to be mounted with a circular tubular frame having a diameter of less than the diametrical corner-to-corner distance of the lamination, said lamination having four rounded corners having a circular edge formed with a radius corresponding to said core diameter, three corners of said four corners of said lamination being correspondingly formed and each having a centrally located connecting notch and a plurality of corresponding openings generally within the corner of the lamination to the opposite side of said notch, said openings to each side of said notch including a first opening in the shape of a right triangle and having sides extending generally parallel to said notch and to the other circumference of said corner and having a hypotenuse extending circumferentially and radially outwardly between the opposite outer edges of said opening sides, said opening to each side of said notch including second and third openings each in the form of a right triangle and located with said second openings having a hypotenuse adjacent and partially overlapping the hypotenuse of said first opening and having a base portion extended and located downwardly and generally aligned with the adjacent edge of the circular edge of the corner, said third opening located with a hypotenuse generally parallel to the side edge of the lamination and having a base portion aligned with said base portion of said second opening, the fourth corner of said four corners having a frame notch with an inner portion essentially corresponding to an inner portion of the frame notch of the three corners, the outer portion of said frame notch having stepped outer sidewalls defining an inner recess adjacent said inner portion and outer recess, a plate member secured within said frame notch and closing the notch and defining a continuous surface across the notch, and a frame bar secured within said outer recess and located axially of the core, said frame bar defining an outer surface having an outer radius no greater than said radius of said circular edge.

* * * * *

UNITED STATES PATENT AND TRADEMARK OFFICE
CERTIFICATE OF CORRECTION

PATENT NO. : 4,912,350

DATED : March 27, 1990

INVENTOR(S) : MILLIS V. PARSHALL ET AL

It is certified that error appears in the above-identified patent and that said Letters Patent is hereby corrected as shown below:

Claim 8, column 10, line 15, delete "of curved" and substitute therefor -- said round --; Claim 8, column 10, line 15-16, delete "of said laminations".

Signed and Sealed this

Twenty-third Day of June, 1992

*Attest:*

DOUGLAS B. COMER

*Attesting Officer*  *Acting Commissioner of Patents and Trademarks*